July 19, 1938.　　　　　G. F. BAHR　　　　　2,124,513
SPLASH GUARD FOR VEHICLE WHEEL FENDERS
Filed July 27, 1935

INVENTOR
Gustave F. Bahr
BY
John A. Johnson
ATTORNEY

Patented July 19, 1938

2,124,513

UNITED STATES PATENT OFFICE 2,124,513

SPLASH GUARD FOR VEHICLE WHEEL FENDERS

Gustave F. Bahr, Fairfield, Conn., assignor to Casco Products Corporation, Bridgeport, Conn., a corporation of Connecticut Application July 27, 1935, Serial No. 33,456

8 Claims. (Cl. 280—154.5)

This invention relates to splash guards for motor vehicles.

An object of this invention is to mount the splash guard behind the vehicle wheel and independently of the rear edge of the fender. At the present time, motor vehicles, particularly passenger automobiles, are being manufactured with the rear edge of the fender variously shaped, and it is difficult to secure a splash guard to the rear edge of the fenders of such vehicles, unless the splash guard is made to fit each particular style of fender.

To avoid this, the present invention provides a splash guard which may be mounted independently of the rear edge of the fender.

This is accomplished, in the form of the invention herein disclosed, by providing a supporting member for the splash guard apron which extends transversely of the vehicle between the bottom of the side of the fender on the one hand and the chassis frame on the other.

An important feature of this invention is the provision of the supporting member with jaws at opposite ends which releasably clamp the bottom of the side of the fender and the chassis frame.

Another feature of this invention is the provision of these releasable jaws in such a way that both jaws open in the same direction, so that they may engage the inwardly-directed flange on the bottom of the fender and the inwardly-directed flange on the chassis frame. With this arrangement, it is not necessary to completely remove the movable jaws from the fixed jaws, but, instead, it is merely necessary to loosen the jaws and slip them over their respective inwardly-directed flanges by moving the supporting member laterally and outwardly of the vehicle.

Another feature of this invention is the provision of the screws for the clamping jaws in a vertical plane so that they may easily be adjusted to tighten the same when in place on the vehicle.

Still another feature of this invention is the provision of means for connecting the apron to the supporting member in such a way that these means may be rotated about a vertical axis to bring the same to either edge of the supporting member so that the same supporting member may be used for both the right and the left hand fenders.

And still another feature of this invention is the provision of the means for connecting the apron to the supporting member so that the apron is located between the supporting member and the vehicle and extends substantially above the supporting member to prevent mud and the like from collecting on the supporting member.

Other features and advantages will hereinafter appear.

In the accompanying drawing, which illustrates one form of this invention, that at present preferred—

Figure 1:
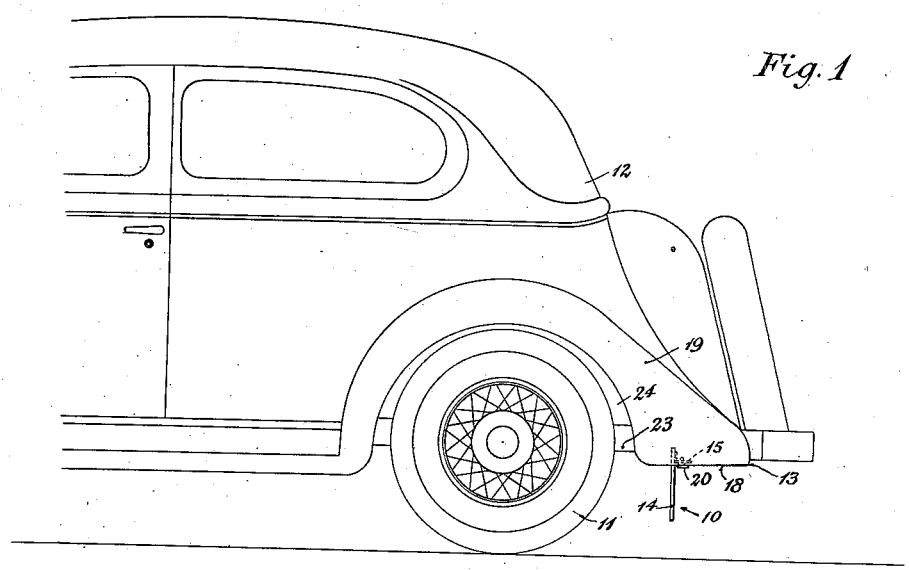
Figure 1 is a side elevation of the rear portion of a passenger automobile, showing the position of the splash guard with relation to the fender and the vehicle wheel.
Figure 3:
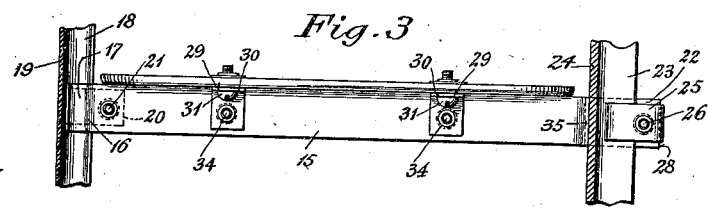
Fig. 3 is a plan view of the part shown in Fig. 2, also showing a fragment of the fender and chassis frame in section.
Figures 2, 4, 5:
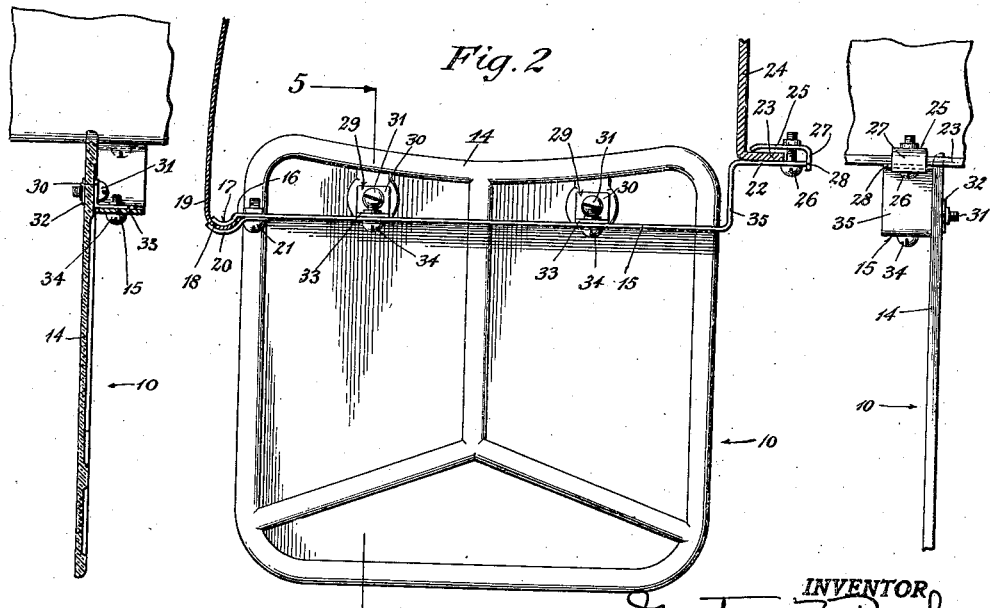
Fig. 2 is a rear elevation of the splash guard, with the portion of the fender and portion of the chassis frame to which it is attached shown in section.
Fig. 4 is a side elevation of the splash guard, showing a fragment of the chassis frame to which it is attached.
Fig. 5 is a sectional view taken substantially on the line 5—5 of Fig. 2, and looking in the direction of the arrows.

As indicated in Fig. 1, the splash guard 10 of the present invention is located between the wheel 11 of the passenger automobile 12 and the rear edge 13 of the fender. The rear edge of the fender tapers inwardly and rearwardly so that there is no substantially flat or plain edge at the rear of the fender to which the splash guard may be applied, as was the custom. Yet, it is desirable, even in so-called bullet-shape and beaver tail shape fenders, to provide a splash guard to prevent water and mud from being thrown up into the atmosphere behind the vehicle or against the windshield and other parts of a following car.

To provide a splash guard for such vehicles, the present invention provides any suitable or usual form of apron 14 and, instead of securing the apron directly to the fender, it is mounted on a supporting bar 15 which may be located between the wheel 11 and the rear edge 13 of the fender.

To mount the supporting bar 15, it is provided at each end with a clamp. At one end the clamp has a fixed jaw 16, the end of which is curved as at 17 to substantially conform to the curved bottom edge 18 of the side 19 of the fender. Cooperating with this fixed jaw 16 there is a movable jaw 20 releasably secured to the fixed jaw by a screw 21. The movable jaw engages the outer and bottom surface of the flange 18 of the fender and when the screw 21 is tightened the jaws 17 and 20 tightly embrace the flange 18.

At the other end, the supporting member 15 is provided with a fixed jaw 22 which lies under a flange 23 on the chassis frame 24 of the vehicle. Cooperating with the fixed jaw 22, there is a movable jaw 25 connected to the fixed jaw by a screw 26. The jaw 25 extends over the flange 23, and hence, when the screw 26 is tightened, the jaws 22 and 25 are drawn together and securely grip the flange 23.

The curvature of the fixed and movable jaws 17 and 20 tends to align them over and under the curved flange 18 of the fender. However, with the jaws 22 and 25, this condition does not exist, and hence to maintain the jaw 25 substantially superposed over the jaw 22, the jaw 25 is provided with a depending ear 27 to engage the edge 28 of the jaw 22 and hold the jaws aligned and the jaw 25 against turning when the screw 26 is tightened.

According to the present invention in its preferred form, the apron 14 is mounted on the supporting bar 15 so as to be between the latter and the vehicle wheel and to extend substantially above the supporting bar. This is done so that the apron will tend to prevent mud and the like from accumulating on the supporting bar.

To attach the apron to the supporting bar, the latter is provided with two dihedral angle plates 29 having a vertical portion 30 provided with an aperture through which a screw 31 may extend to engage a nut 32 embedded in or secured to the apron 14. The horizontal portion 33 of each angle plate is secured to the latter by a vertically disposed screw 34. Before the apron 14 is secured to the portions 30 of the angle plates, screws 34 may be loosened and the angle plates may be rotated about the vertical axis of the screws, so that the vertical portion of the angle plate will be located at either edge of the supporting bar 15. Hence, even though the opposite ends of the supporting bar 15 are different, the same identical supporting bar 15 may be used on either the right or left hand fender, thus avoiding the necessity of making right and left hand parts with the accompanying added cost and danger of confusion.

It should be noted that the jaws 17—20 and 22—25 both open in the same direction, that is, toward the outside of the vehicle. Hence, when both movable jaws are released, the supporting member may be applied to the chassis frame and the fender's edge by moving the supporting member laterally and outwardly, and hence it is not necessary, according to the present invention, to completely remove the movable jaws from the fixed jaws to apply the supporting member to the fender and frame.

It should also be noted that the screws 21 and 26 are vertically disposed, and hence they are easily tightened without interference from adjacent parts of the vehicle and with a screw driver of ordinary and convenient length.

In most vehicles, the flange 18 at the bottom of the side of the fender is substantially lower than the flange 23 of the chassis frame. To avoid the necessity of angularly disposing the supporting member member and making the angle plates 29 different from each other, the present invention offsets one of the jaws vertically relative to the other. In the form of the invention herein disclosed, the inside jaws 22—25 are higher than the outside jaws 17 and 20, and to accomplish this the supporting member is provided with a vertical portion 35 connecting the jaw 22 with the main portion of the supporting member.

In applying the splash guard to the vehicle, the apron 14 may be assembled on the supporting member 15, and the entire assemblage may be applied to the vehicle as a unit, or, if desired, the screws 34 may be removed to disconnect the angle plates 29 from the supporting member, and the supporting member may be put in place after which the apron may be secured to the supporting member by the angle plates and screws 34.

Variations and modifications may be made within the scope of this invention and portions of the improvements may be used without others.

Having thus described the invention, what is claimed as new and for which it is desired to obtain Letters Patent, is:—

1. In a splash guard for motor vehicles the combination with an automobile fender the rear portion of which is substantially spaced from a vehicle wheel, of an apron adapted to hang substantially vertically behind the wheel of the vehicle; a supporting member extending from the outer edge of the fender to the chassis frame and having means at opposite ends adapted to clamp upon the bottom of said outer edge and the chassis frame respectively so as to be disposed forwardly of the rear of said fender a substantial distance, said clamping means each comprising a fixed jaw and a movable jaw, and said jaws facing in the same direction so that the supporting member may be applied to the chassis frame and outer edge of the fender by a lateral movement in one direction when the jaws are partially open; and means for securing the apron to the supporting member.

2. In a splash guard for motor vehicles the combination with an automobile fender the rear portion of which is substantially spaced from a vehicle wheel, of an apron adapted to hang substantially vertically behind the wheel of the vehicle; a supporting member extending from the outer edge of the fender to the chassis frame and having means at one end adapted to clamp to the bottom of the outer edge of the fender, and means at the other end adapted to clamp to the chassis frame so that said member is supported forwardly of the rear of said fender a substantial distance, one said clamping means including a clamping part shaped to grip said edge and the other of said means including a clamping part shaped for clamping said frame, such shapings being different; and means for securing the apron to the supporting member between the latter and the vehicle wheel, said last named means including a pair of dihedral angle plates each having one side secured to the apron and the other side mounted on the supporting member for pivotal movement about a vertical axis to bring the other side of the plate to either edge of the supporting member so that said member and apron may be applied to either the right or left side of a vehicle.

3. In a splash guard for a motor vehicle having a fender the outer edge of which has an inward bend and the rear portion of which is substantially spaced from the underlying vehicle wheel, and having a chassis frame including a substantially horizontal flange, the combination of an apron adapted to hang substantially vertically under the fender and behind the wheel of the vehicle; a supporting member extended across the vehicle from the outer edge of the fender to the chassis frame and having securing means at opposite ends, each of said securing means including a pair of coacting jaws one of which is fixed on said member and the other of which is movable in a substantially vertical direction relative to the fixed jaw, and a substantially vertical draft screw forming a part of each securing means and operable from its lower end to perform movement in a substantially vertical direction thereby to draw its associated jaws together, one pair of jaws being shaped to engage and grip therebetween the bent bottom edge of the fender when said jaws are drawn together, and the other pair of jaws being shaped to engage and grip therebetween said chassis frame flange when said jaws are drawn together; and means for securing the apron to the supporting member.

4. A splash guard as defined in claim 3, and for a vehicle wherein the flange of the chassis frame is higher than the outer edge of the fender, in which one end of the supporting member is vertically offset from the other end thereof so that the intermediate portion of said member may be substantially horizontal.

5. A splash guard as defined in claim 3, in which said bend of the fender has a transversely concave upper side, and in which one of the jaws of the securing means for the fender edge is shaped to lie within and lock against said concavity.

6. A splash guard as defined in claim 3, in which both jaws of the securing means for the fender edge are extended with their free ends directed, from a point below the fender, substantially horizontally toward the bent edge of the fender.

7. A splash guard as defined in claim 3, in which the securing means for the chassis frame flange includes means for holding one of said jaws in predetermined extension relative to the other during tightening of the associated draft screw.

8. A splash guard as defined in claim 3, in which the securing means for the chassis frame flange has one of its jaws provided with an offset extension for engaging the other jaw to hold the jaws in predetermined extension relative to each other during tightening of the associated draft screw.

GUSTAVE F. BAHR.